United States Patent [19]

Smades

[11] Patent Number: 4,549,918
[45] Date of Patent: Oct. 29, 1985

[54] PRECISION WIRE GRID GLASS DIGITIZING TABLETS

[75] Inventor: Jack E. Smades, Scottsdale, Ariz.

[73] Assignee: Sanders Associates, Inc., Nashua, N.H.

[21] Appl. No.: 553,895

[22] Filed: Nov. 21, 1983

Related U.S. Application Data

[62] Division of Ser. No. 433,602, Oct. 8, 1982, Pat. No. 4,513,043.

[51] Int. Cl.$^4$ ............................................. B32B 5/12
[52] U.S. Cl. .................................. 156/160; 156/494; 156/556; 428/113; 428/256
[58] Field of Search ................ 428/113, 256; 156/160, 156/494, 556

[56] References Cited

U.S. PATENT DOCUMENTS 4,268,562  5/1981  Bacon .................................. 428/113

Primary Examiner—Marion E. McCamish
Attorney, Agent, or Firm—Louis Etlinger; Wm. F. Porter, Jr.

[57] ABSTRACT

An improved wire grid glass tablet for digitizing graphic information which includes a glass plate with a resin layer bonded to one side and having orthogonal grids of wires, made of a ductile material which is stretched beyond the yield point, embedded in the resin layer near the surface thereof to maximize signal-to-noise ratio coupling to the wires.

23 Claims, 21 Drawing Figures

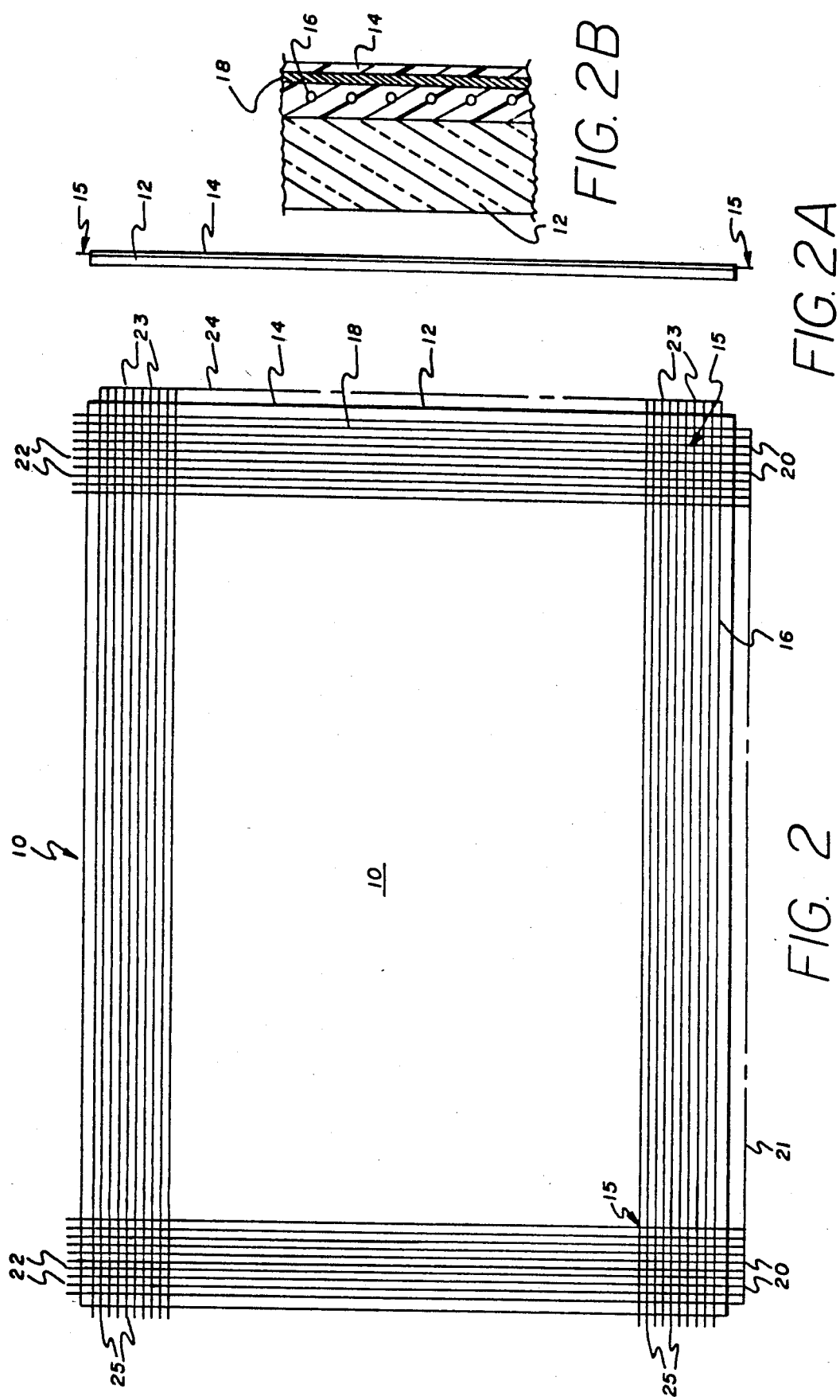

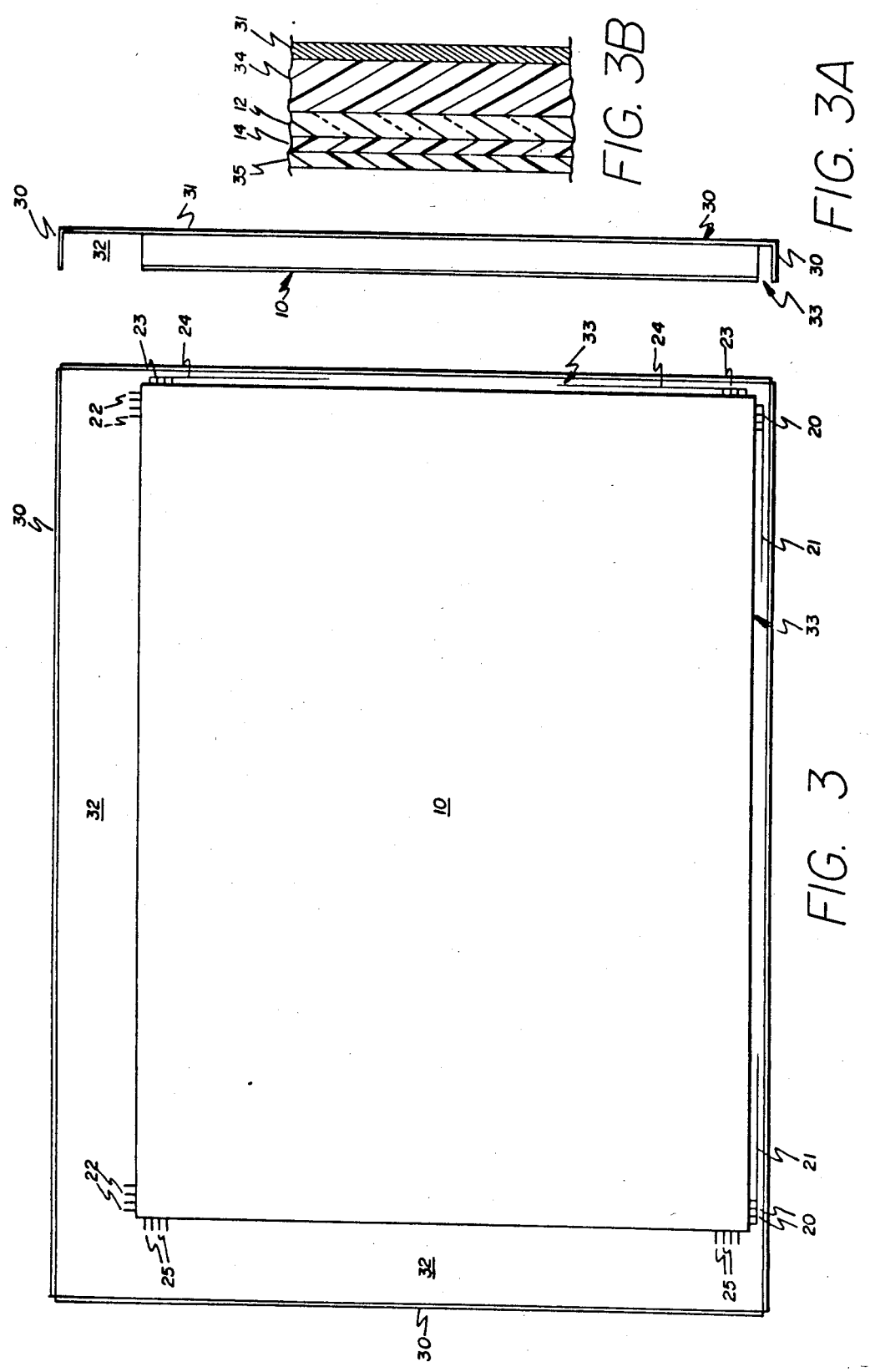

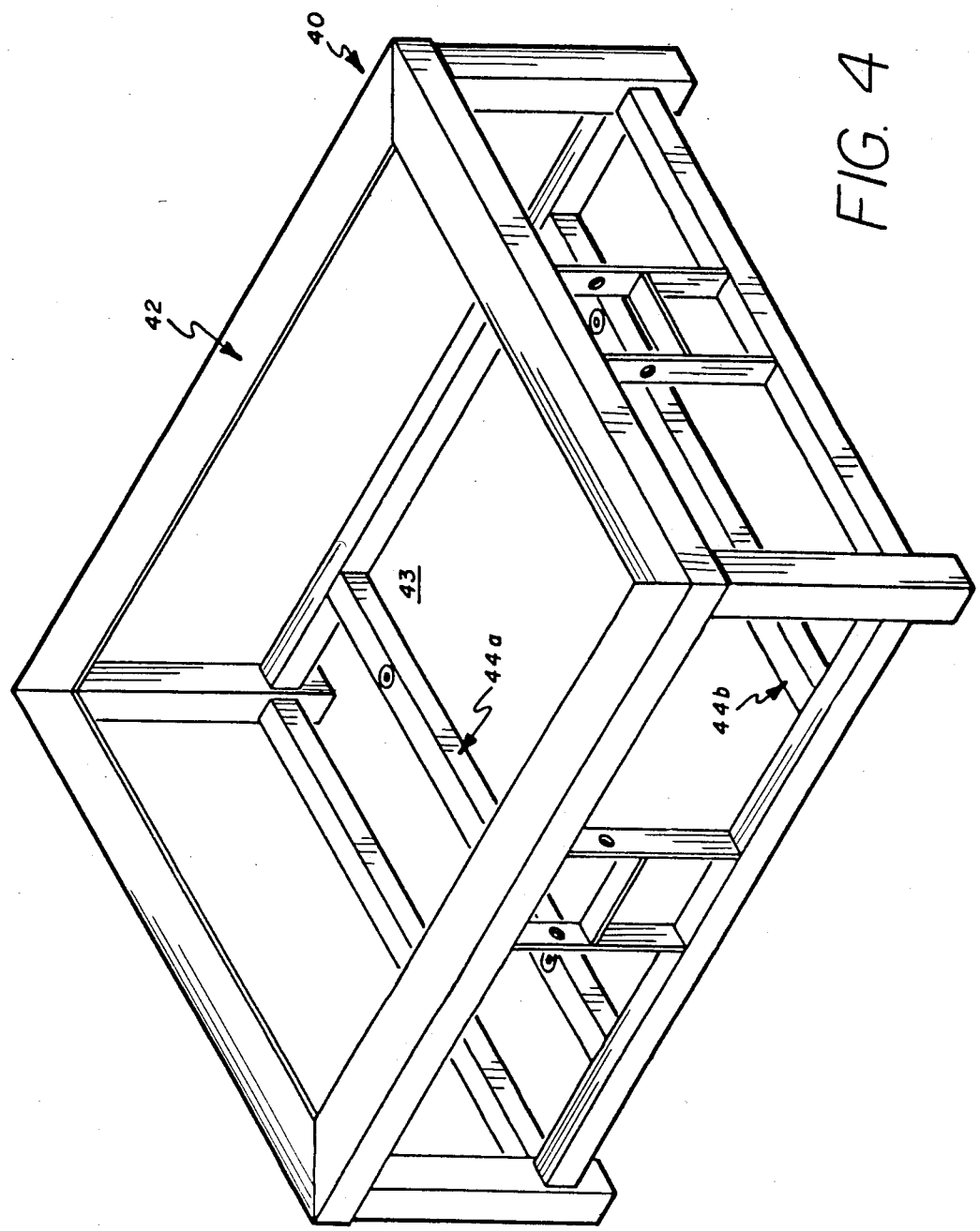

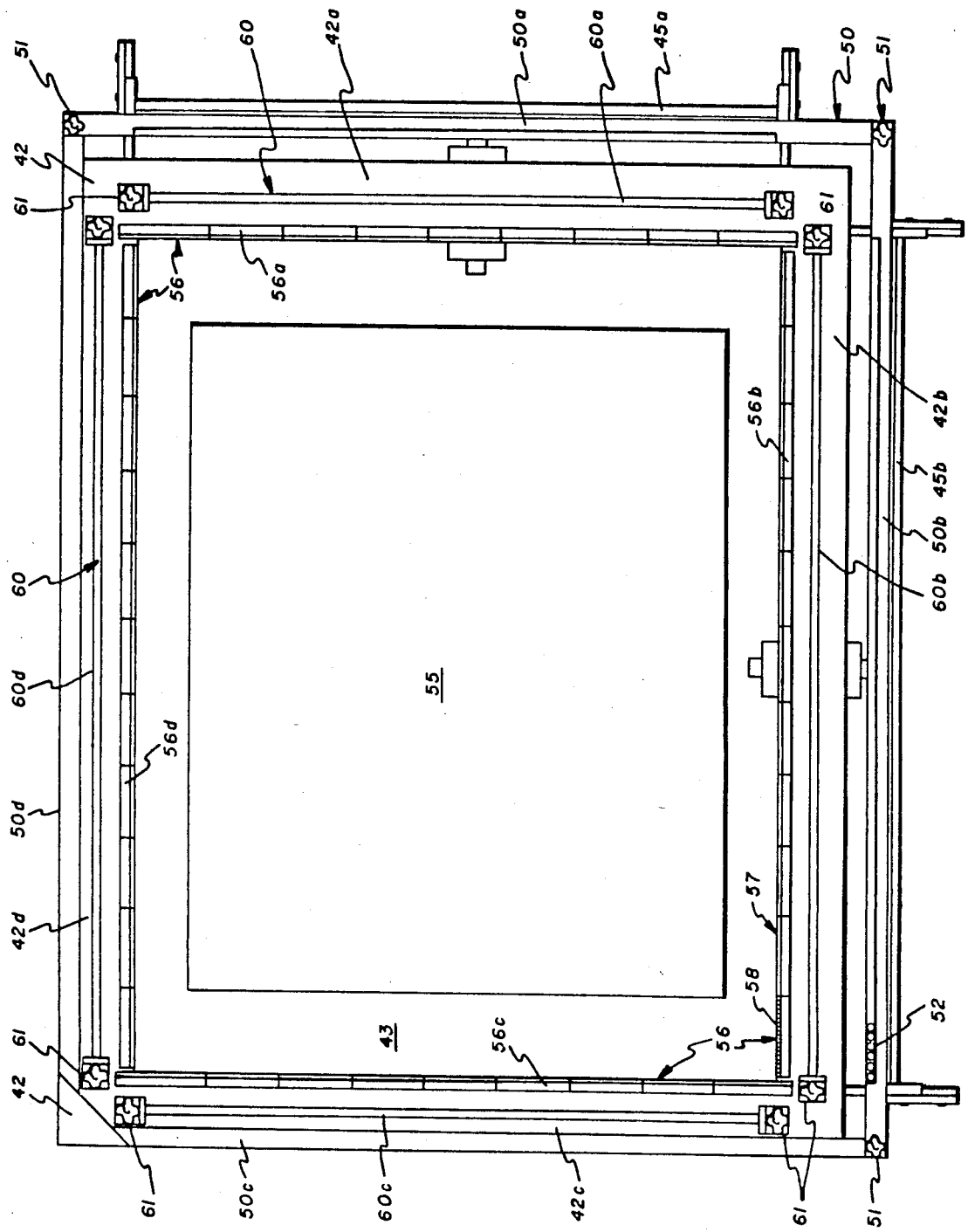

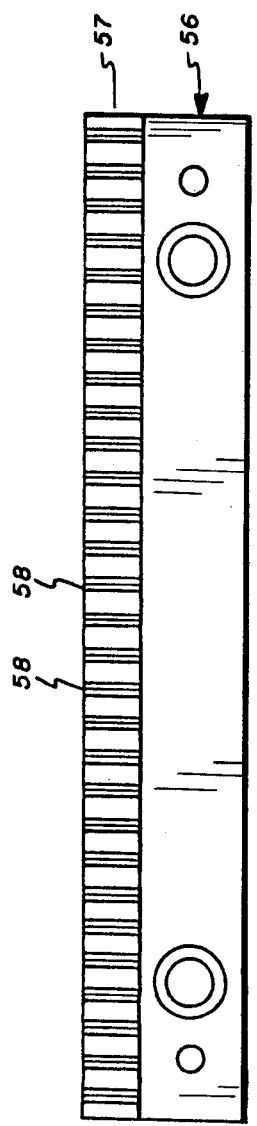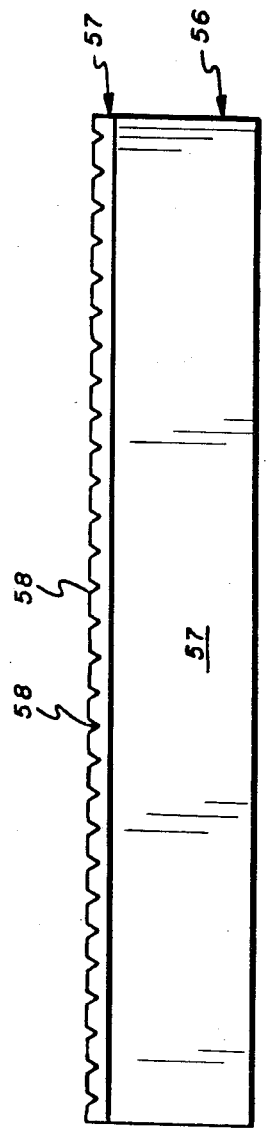

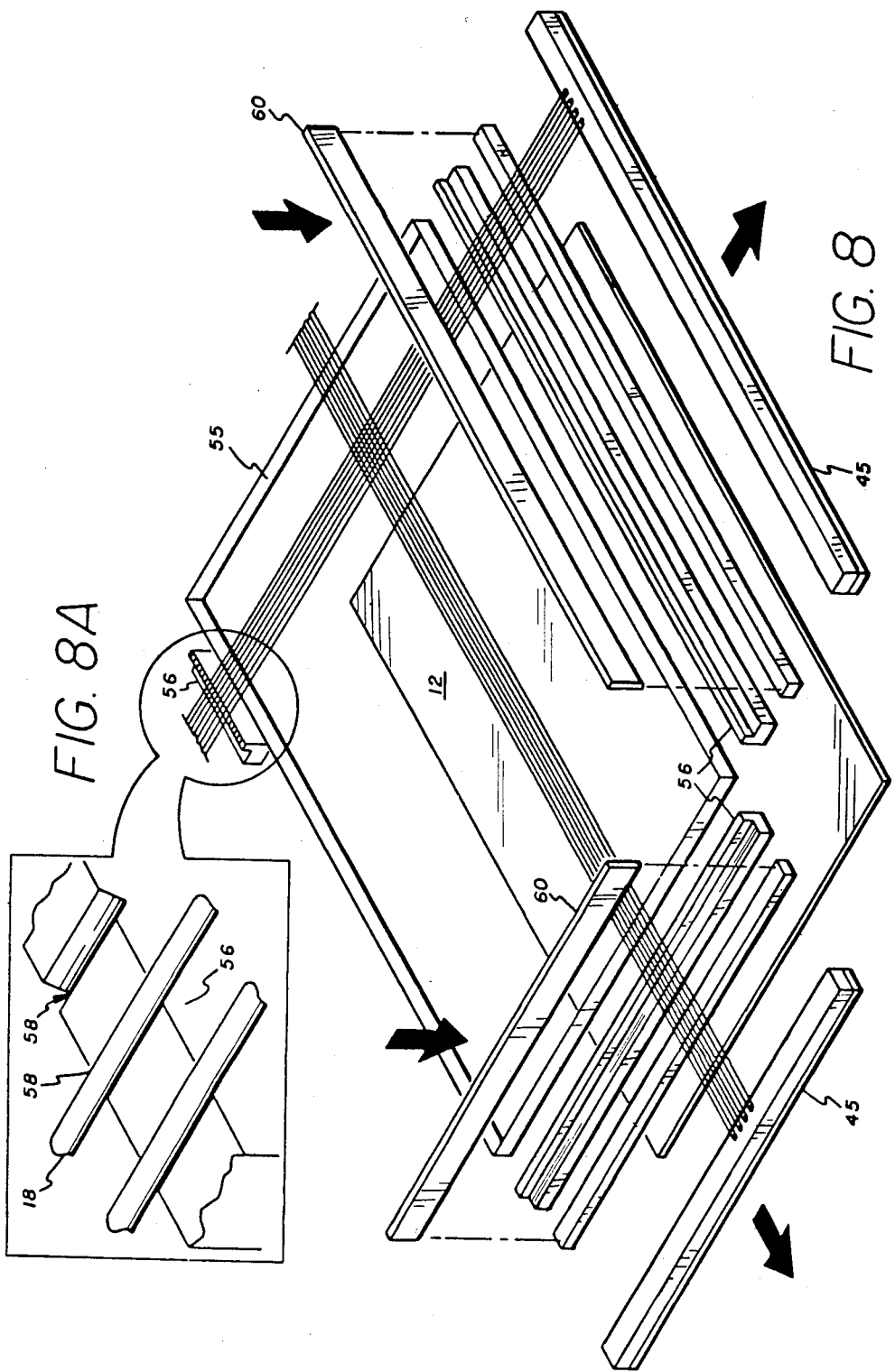

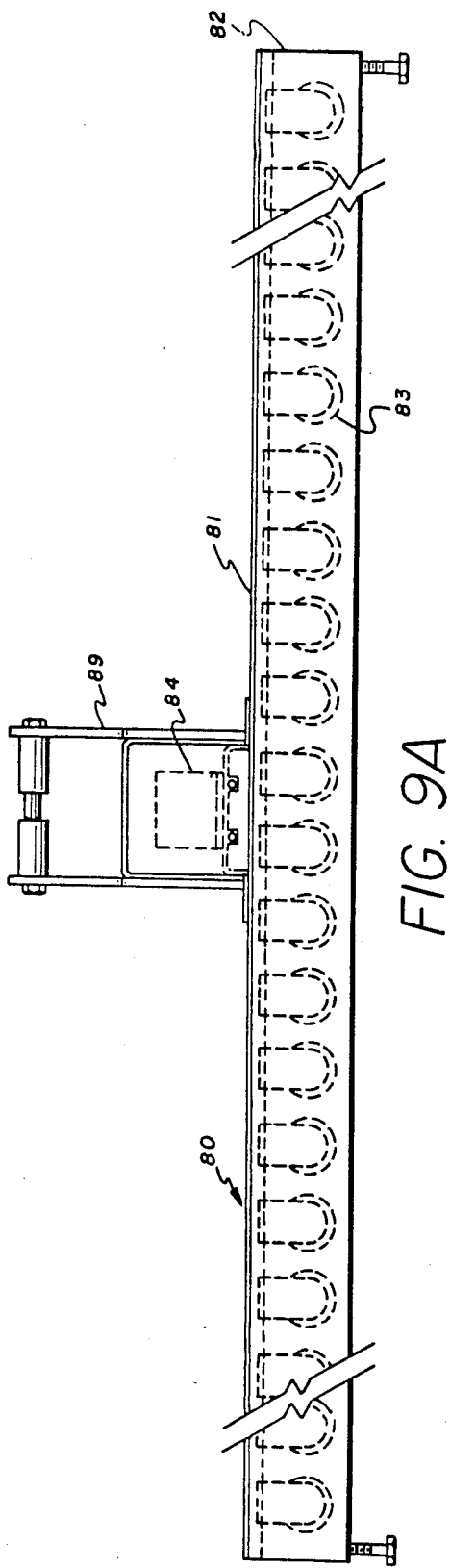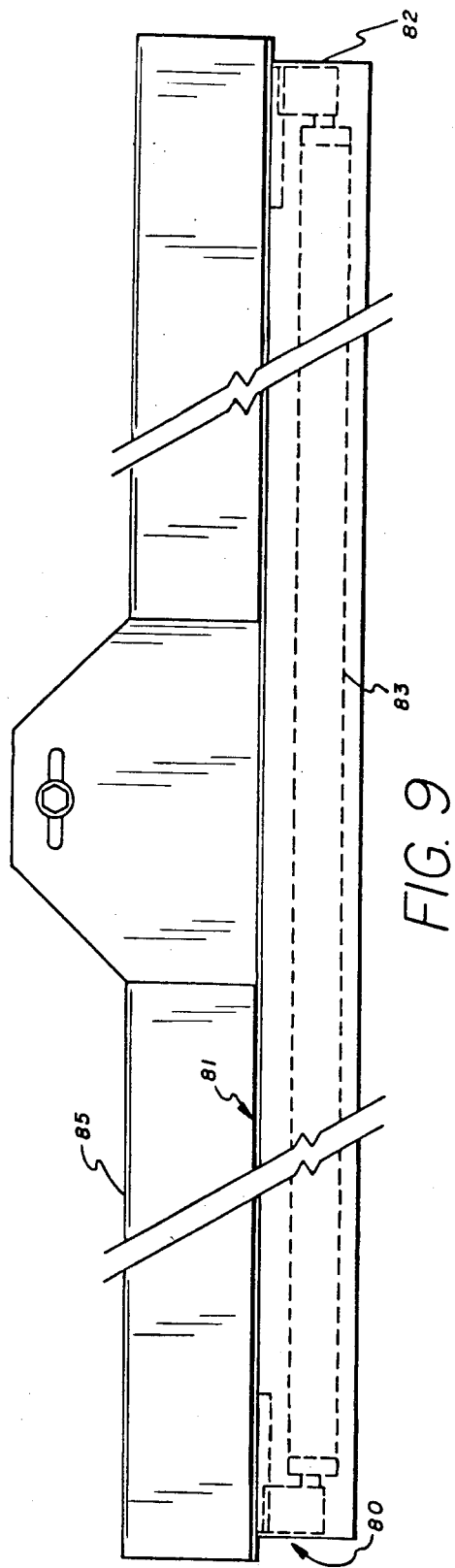

PRECISION WIRE GRID GLASS DIGITIZING TABLETS

This is a division of application Ser. No. 06/433,602, filed Oct. 8, 1982 now U.S. Pat. No. 4,513,043, issued Apr. 23, 1985.

TECHNICAL FIELD

This invention relates to an improved wire grid glass tablet, used, for example, in digitizers for digitally encoding graphic location and movement information into corresponding electrical signals with high accuracy. The invention also relates to new methods and apparatus for fabricating the high accuracy wire grid glass digitizing tablets.

BACKGROUND ART AND PRIOR ART STATEMENT

Digitizer tablets are used in conjunction with a writing pen or instrument for converting graphic information into digital coordinate signals. The tablet or platen is formed with an XY grid of parallel conductors to which signals are applied for detection by the pen or instrument or which are scanned to detect signals from the pen or instrument. A variety of known methods are available for converting the location and movement information of the pen or instrument relative to the tablet into electrical signals such as, for example, described in U.S. Pat. Nos. 3,767,858; 3,983,322; 4,022,971 and 4,185,165.

A typical digitizer or platen has first and second sets of grid conductors in parallel planes embedded in a resin plate having a flat work surface referred to as the digitizing surface. The conductors of the first grid run perpendicular to the conductors of the second grid and all the grid conductors are electrically insulated from each other. The writing pen or other instrument bears upon the digitizing or working surface.

Prior tablets or platens of a resin material are typically manufactured by pulling grid wire material such as 0.02 inch piano wire or music wire, a structurally strong steel wire, between precision spacing guides or bridges. The piano wire is cut to length and loops are formed at each end. Tension is applied to each individual wire aligned over a cavity, using, for example, springs to hold them tightly. In this manner, two sets of conductors in the X and Y coordinate directions are tautly suspended in planes spaced from each other approximately 0.05 inches apart. The taut X and Y conductors extend through a mold or cavity and a rubber gasketed cover is placed over the wire matrix. Liquid resins such as liquid vinyl resin or catalyzed polyester resin are introduced into the cavity or mold. After the resin has been poured and the mold or cavity filled so that the X and Y coordinate grids are immersed and embedded in the liquid, the resin is allowed to cure for approximately 14 hours at a temperature of approximately 75 degrees F. The exotherm temperature of the resin at the time of curing may reach 200 degrees F., however.

A number of disadvantages are attendant upon this conventional method for fabrication of digitizer tablets and platens. It is difficult to apply sufficient tension to the highly tensile piano wire to straighten out kinks or bends in the wire and the taut music wire presents a danger to workers. It is costly to cut the wires individually to length and form loops and highly accurate positioning of the individual wires is difficult to achieve. Furthermore, during curing the polyester resin shifts, shrinks, expands and distorts the wire matrix grid pattern. The displaced grid conductors do not return precisely to their original position thereby limiting the accuracy of the grid conductors for encoding graphic position information.

Another method of fabricating digitizer tablets or platens uses screen printing and printed circuit techniques for forming the grids of parallel conductor strips on first and second glass plates. As described in U.S. Pat. No. 4,255,617, the X and Y coordinate grids are formed respectively on two pieces of float glass as shown in FIG. 3 of that patent, and the two pieces of glass are laminated together by a resin layer that separates and insulates the orthogonal X and Y grid components. Such a method, however, suffers the disadvantage that multiple glass plates must be used, and the printed circuit traces are subject to damage or defect during manufacture in contrast with the wire grid matrix.

U.S. Pat. No. 2,194,551 describes a method for producing a polarizing body consisting of a glass plate with fine wires embedded in the glass to a density of, for example, 40,000 or more parallel layers per inch. According to the disclosure in this patent, a method is proposed for packing powdered glass above and below the mounted wires and heating the whole mass in a furnace so that the glass and wires are heated simultaneously, the glass melting around the wires. The glass and wire are then stretched together while the glass is in a plastic state. The stretching elongates the glass and wires, bringing the wires closer together for light polarizing effects. This U.S. patent disclosure is for an entirely different purpose from the present invention, actually heating and stretching both a glass material and embedded set of wires together.

U.S. Pat. No. 2,194,551 relates only to methods of producing flat surfaces such as mesh screens or screen electrodes by a stretching treatment and is otherwise unrelated to the present invention.

OBJECTS OF THE INVENTION

It is therefore an object of the present invention to provide a digitizer tablet or platen using separate wire grids for the X and Y coordinate matrix, but based upon a glass plate substrate for stability and freedom from the parametric variation characteristics of plastic and resin tablets.

Another object of the invention is to provide a glass tablet or platen with highly accurate wire location, and straightness of the wires composing the X, Y coordinate grid.

Another object of the invention is to provide a wire grid glass platen using ductile wire rather than wire having a relatively high yield point for high accuracy and straightness of the wire by application of tension beyond the yield point of the ductile wire.

A further object of the invention is to provide a wire grid glass platen wherein the wire grids are close to the surface thereof to maximize signal-to-noise ratio for a pen/cursor.

Finally, the invention contemplates a new method for manufacture of high accuracy wire grid tablets and platens using a single glass plate and to a fixture and framework for carrying out the method.

DISCLOSURE OF THE INVENTION

In order to accomplish these results the present invention provides an improved wire grid glass tablet for digitizing graphic information in the form of corresponding electrical signals in which a flat glass plate forms the structural base for the tablet. A resin layer is bonded to one surface of the glass plate.

According to the invention, a first grid of accurately spaced parallel wires is embedded in the resin layer and arranged in a common plane parallel to the plane of the glass plate. In particular, the wires comprise a ductile material having been stretched to beyond the yield point, thereby exhibiting plastic flow and straightness. A second grid of parallel wires is also immersed in the resin layer spaced from the first grid, the first and second grids forming the X, Y coordinate matrix. The second grid also comprises accurately spaced parallel wires in a common plane parallel to the plane of the glass plate, but of course, spaced from and insulated from the first grid. The wires of the second grid have also been stretched to beyond the yield point exhibiting plastic flow and straightness.

According to another feature of the invention the resin layer is relatively thin with respect to the glass. The resin remains in this thin uniform state during curing because it is placed on a levelled glass plate, because of its viscosity, and because of the forces of gravity and surface tension.

It is apparent that the tablet or platen construction according to the present invention affords the stability and accuracy of a glass plate structural base while avoiding the more expensive and vulnerable printed circuit X, Y coordinate matrices. The invention retains the advantages of a wire grid but minimizes the plastic or resin layer, assures the straightness of the wires comprising the matrix, and a safe environment for those assembling the wires.

According to the method of fabricating the precision wire grid glass tablet, a first wire grid is formed by stringing wire of ductile material on a frame assembly around accurately aligned and spaced rollers, traversing the lengths of wire back and forth in a parallel array. A second grid of wires is similarly formed on the frame assembly in a second parallel array spaced from the first, with the lengths of wire running perpendicular to the lengths of wire of the first grid.

The invention further contemplates preparing a flat glass plate by spreading a resin material over the flat upper surface of the glass plate and delaying curing of the resin layer during a period of time permitting the resin layer to self-distribute evenly under the influence of gravity and surface tension. This may take, for example, 15–30 minutes for settling after pouring or manually leveling the resin layer.

An important step of the invention is tensioning the lengths of wire of the first and second grids to beyond the yield point of the ductile material comprising the wire until the wire exhibits plastic flow thereby assuring straightness of the lengths of wire.

In another critical step, the glass plate is raised beneath the first and second grids, immersing the lengths of wire of the grids in the resin layer supported on the upper surface of the glass plate. After several minutes' settling, the resin layer is rapidly cured, embedding the X,Y coordinate grid and bonding to the glass plate. Rapid curing is achieved using anaerobic and ultra-violet light sensitive resins which undergo rapid curing upon flooding, for example, with nitrogen or carbon dioxide to exclude oxygen and upon irradiating with an ultra-violet light fixture operatively positioned relative to the glass tablet.

The invention contemplates a number of variations in the method of fabricating high accuracy wire grid glass tablets and supplemental steps. For example, during the period of settling of the resin layer on the flat and level glass plate, a volatile solvent may be sprayed over the surface of the resin layer prior to curing thereby releasing bubbles from the surface to facilitate leveling and settling. In a more detailed look at the method, each wire grid of the respective X or Y coordinate matrix comprises a single wire assembled by stringing a single piece of wire back and forth in serpentine fashion around rollers at opposite sides of the parallel array. In a further subtlety of the method, the tensioning of the wire is accomplished by distributing the tensioning force evenly to each of the lengths of wire of the parallel array comprising, for example, 320 wires of 85" segments.

In order to carry out the method the invention provides an apparatus for fabricating high precision wire grid glass tablets in the form of a heavy weight base fixture constructed and arranged for bearing wire tensioning forces. Since each wire element of the grid is subjected to, for example, 8 pounds of force for 28 gauge tinned copper wire, with as many as 320 such wires comprising the longer grid coordinate, forces totaling thousands of pounds may be exerted. The base structure has an upper portion for supporting and retaining a grid wire frame assembly on which the grid wires are mounted and a central cavity portion comprising a lift platform for raising and lowering a plate or tablet in accurately aligned horizontal position beneath the X,Y coordinate wire grids.

The base fixture is a four-sided framework, each side having an outer bearing surface for receiving the grid wire frame assembly and an inner wire locating rail for accurately spacing and aligning the wires of an X,Y coordinate grid in the manner hereafter described.

The grid wire frame assembly is clamped to the outer bearing surfaces of the base fixture four-sided framework and at least two sides of the grid wire frame assembly are separable. Two of the outer bearing surfaces of the base fixture four-sided framework comprise wire pull-out bars which are also separable and moveable outward from the respective assembly and fixture for tensioning the lengths of wire of an X,Y coordinate grid beyond the yield point of the ductile material used for the wire. Hydraulic cylinders exert the tensioning force and form an integral part of the base fixture.

The grid wire frame assembly is a four-sided framework with rollers accurately spaced around the face of the framework. Each of the X and Y coordinate portions of the conducting grid or matrix is actually a single wire, winding alternately back and forth around the rollers of two opposite sides. Therefore, when the grid wire frame assembly is clamped to the base fixture and tension is applied to the respective X and Y coordinates of the grid by wire pull-out bars of the base fixture, the tensioning force is distributed evenly among lengths of wire by the rollers.

After tensioning, hold-down bars are mounted around the four-sided framework between the outer bearing surfaces on which rest the sides of the grid wire frame assembly and the inner wire locating rails with the accurately spaced grooves. The hold-down bars urge the wires of each respective coordinate into the grooves of the wire locating rail, thereby accurately spacing and aligning the lengths of wire.

The base fixture is also formed with a central cavity and a lift platform mounted for vertical translation within the cavity. The lift platform receives and supports a glass substrate and is raised and lowered within the cavity by, for example, hydraulic lifts.

Before the grid wire frame assembly is placed on the base fixture, the glass substrate is placed on the lift platform while it is in raised position. The substrate is prepared with a layer of uncured resin over its surface. After settling and flattening of the resin layer, the lift platform is lowered and the grid wire frame assembly placed in position over the fixture. The grid wires are then tensioned and accurately spaced and aligned as set forth above. The lift platform then raises the glass substrate to a stop position where the X and Y coordinates of the conductive grid or matrix are immersed in the resin layer.

After settling, an ultra-violet light hood with an area coextensive with the base fixture and grid wire frame assembly is lowered substantially covering the upper surface of the base fixture and grid wire frame assembly. Rapid curing of the resin layer is achieved by ultra-violet irradiation. Furthermore, the hood serves as a manifold for delivering an anaerobic gas, such as nitrogen or carbon dioxide for excluding oxygen. An anaerobic curing resin is preferably used for accelerating the cure upon displacement of the oxygen. The lift platform is also a platform provided with stop means for stopping the raising of the glass plate and resin layer when the first and second grids supported on the wire frame assembly are immersed in the resin layer spread across the upper surface of the glass plate.

The invention also contemplates incorporating the high accuracy wire grid glass tablet in a laminar structure or honeycomb sandwich structure for increased strength and durability in tension and compression. According to this sandwich structure, a layer of Formica type material or other working surface material is bonded over the resin layer of the tablet to provide the working surface, writing surface, or digitizing surface. The glass side of the tablet is bonded to a honeycomb structural layer of, for example, phenolic impregnated paper which is, in turn, bonded to a steel sheet of 18 to 24 gauge. Such a laminar or sandwich structure gives strength in tension and compression to the glass tablet or platen. Furthermore, the steel sheet provides an electromagnetic shield for greater accuracy in digitally encoding graphic information.

A back-lighted laminar tablet structure may also be provided according to the invention, substituting a translucent or transparent material for the Formica working and digitizing surface and a wire screen for the shield and eliminating or substituting transmitting material for other opaque layers.

In each of the embodiments of the present invention, it is to be noted that a glass plate forms the structural layer of the glass tablet itself and is relatively immune from parametric variation under environmental stress. The resin layer is a relatively thinner layer bonded to the surface of the glass plate and merely serves the purpose of immersing and insulating, embedding and retaining the X,Y coordinate grids. The resin layer conforms to the stable glass substrate during variation in prevailing environmental conditions.

Other objects, features and advantages of the present invention will become apparent in the following specification and accompanying drawings.

BRIEF DESCRIPTION OF THE DRAWINGS

FIG. 2 is a plan view of the glass tablet showing a fragmentary portion of the X,Y coordinate grid.

FIG. 2A is a side view of the glass tablet.

FIG. 2B is a detailed cross-sectional view of a fragmentary portion of the glass tablet shown in FIG. 2A.

FIG. 3 is a plan view of the glass tablet assembled and bonded into a base for containing the glass tablet electronics.

FIG. 3A is a side cross-sectional view of the tablet assembly of FIG. 3.

FIG. 3B is a detailed cross-sectional view of a fragmentary portion of the side cross-section of FIG. 3A showing the details of the laminar tablet assembly.

FIG. 4 is a perspective view of the structural framework for the fixture or apparatus used in fabricating the wire grid glass tablet.

FIG. 5 is a plan view from above of the glass tablet fabrication fixture showing the central lift platform which supports the glass substrate and the peripheral elements mounted on the fixture used in fabricating the wire grid glass tablet.

FIG. 5A is a detailed plan view, FIG. 5B is a detailed side view, and FIG. 5C is a detailed end view of a segment of the wire locating rails shown in FIG. 5.

FIG. 5D is a detailed end view of a hold-down bar or wire clamp bar of the type shown in FIG. 5.

FIG. 8 is a diagramatic perspective view showing the steps of tensioning wires of the X,Y coordinate grid beyond the yield point of said wires and holding down the wires urging them into grooves of the wire locating rail.

FIG. 8A is a detailed fragmentary view of the wire locating rail showing the position of grid wires in the wire locating rail grooves held in the grooves by the hold-down bar after stretching.

FIG. 9 is a side view of the hood positioned over the fabricating fixture for ultra-violet irradiation and anaerobic gas flooding, while FIG. 9A is an end view of the hood.

DESCRIPTION OF PREFERRED EMBODIMENTS AND BEST MODE OF THE INVENTION

Figure 1:
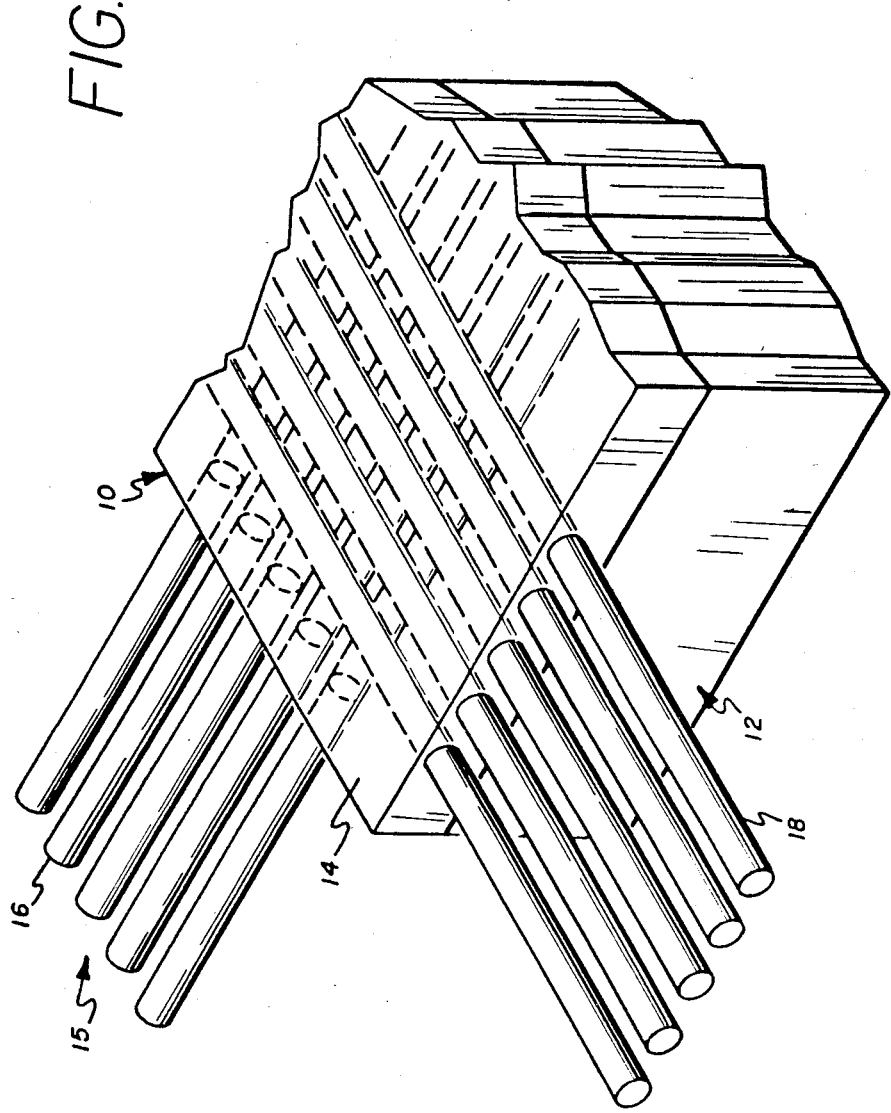
FIG. 1 is a fragmentary perspective view of a wire grid glass digitizing tablet in accordance with the present invention showing the relatively thick, flat glass substrate and the resin layer bonded to the glass substrate in which is embedded the "X, Y" coordinate grid of conducting wires.

The grid wire glass tablet and glass tablet assembly, according to the present invention, are illustrated in FIGS. 1 through 3. As shown in FIG. 1, the basic wire grid glass tablet 10 comprises a flat, glass substrate 12, such as, for example, ⅛" (3.2 mm) float glass and a relatively thinner resin layer 14 bonded to the surface of the glass substrate. The resin layer 14 is preferably a resin or resin mixture which rapidly cures under anaerobic conditions and in response to ultra-violet radiation. Such resins include, for example, acrylic and urethane resins. Embedded in resin layer 14 is an X,Y coordinate grid or matrix 15 of conducting wires for conducting the digitizing signals.

Reference in this specification and accompanying claims to an X,Y coordinate grid or matrix is intended to refer to a first grid of parallel wires 16 representing one of the X or Y coordinate directions, and a second grid of parallel wires 18 orthogonal to the first grid 16 and representing the other of the X or Y coordinate directions. Each of the parallel grids 16 and 18 is formed in a common plane, spaced from the plane of the other so that all of the individual wires of the assembled grid or matrix 15 are insulated from each other within the resin layer 14 of tablet 10.

According to the invention, the conductor grid wire is made of a ductile material such as copper or copper alloy and in the illustrated example, is 28 gauge tinned copper wire. The wire lengths are typically spaced, for example, 0.2 inch (0.5 cm) on center for a spatial frequency of 5 wires per inch (5 wires per 2.54 cm) across the tablet. The tablets typically range in size up to 48 inches (122 cm) by 64 inches (162.5 cm).

Each of the wires of the grid elements 16 and 18 has been tensioned beyond its yield point and stretched a predetermined amount to assure straightness of the wire prior to embedding in the resin layer. For example, in the large size wire grid glass tablet and in the long direction (64 inches/162.5 cm) the original lengths of wire across the grid wire frame during fabrication are 85 inches (216 cm) long. These lengths of wire are each stretched, for example, four inches (10 cm) to achieve the objectives of straightness and accuracy according to the invention.

A plan view of the glass tablet showing only a portion of the wire grid is illustrated in FIG. 2 with the corresponding reference numerals indicated accordingly. In the side view of FIG. 2A it can be seen that the resin layer 14 forms a relatively thin layer, for example, 50 thousands of an inch (1.3 mm) bonded to the thicker and more stable glass substrate 12. The wire grid or matrix 15 can be seen extending from resin layer 14.

In the more detailed cross-sectional view of FIG. 2B it can be seen that the respective wire grid elements 18 and 16 are spaced from each other within the resin layer 14 which is, in turn, bonded to the glass substrate 12.

The terminal ends 20 of parallel grid wire element 18 may terminate at one side in a common lead wire 21, while the other ends 22 from the grid element 18 are left free for circuit connections to the electronics of the tablet assembly. Similarly, the terminal endings 23 at one side of the longer parallel wire grid element 16 may terminate in a common leadwire 24. The opposite ends 25 of the parallel wires of grid elements are left free for coupling to the tablet assembly electronics.

Alternatively, the grid wire terminations or ends 20 and 23 of tablet 10 within the tablet assembly may be left free and uncoupled, analagous to antenna terminations. Whether or not the grid wire terminal ends 20 and 23 are respectively joined to common leads or whether they are left as free antenna terminal ends depends on whether or not the tablet is operating with the grid in an active generating mode or passive signal receiving mode. Both types of tablets are available according to the application requirements.

Referring to FIG. 2B, the width of glass substrate 12 is typically 0.12 inches (0.3 cm), the width of the resin layer 14, 0.05 inches (1.3 mm), and the spacing between the center lines of the parallel wire conductor grid elements 16 and 18, 0.025 inches (0.6 mm), while neither of the grid elements is closer to either surface of the resin layer than 0.011 inches (0.3 mm).

Referring to FIG. 3, the glass tablet 10 is typically incorporated in and bonded to a base 30 as part of the tablet assembly. The tablet assembly base 30 is made from steel sheet metal of, for example, 18 to 24 gauge thickness. The tablet 10 is bonded to a layer of honeycomb 34 (see FIG. 3B) which is, in turn, bonded to the bottom sheet 31 of base 30, and the bottom sheet 31 therefore forms an integral laminar layer of the tablet assembly. Because the base is made of steel sheet, it provides an electromagnetic shield to assure high accuracy of the digitizing signals.

Referring at the same time to both FIGS. 3 and 3A, it is apparent that the tablet assembly base 30 is substantially longer along the X, Y coordinate dimensions than the tablet 10 and the tablet is mounted towards a corner of the base, leaving spaces 32 on two adjacent sides of the assembly between the tablet 10 and base 30 for housing the grid wire glass tablet electronics. Smaller spaces 33 on the other two adjacent sides between the tablet 10 and base 30 provide enough space for the common conductors 21 and 24 joining the terminal ends 20 and 23 respectively of the grid wire conductors on the sides of the tablet adjacent the narrower spaces 33 or for leaving free "antenna" terminal endings. On the other hand, conductors 22 and 25 on the opposite adjacent sides of tablet 10 are available for coupling to the tablet electronics.

The electronic circuits associated with tablet 10 are not a portion of the present invention, and are well known and readily available. Examples of digitizer tablet electronics are found in the patents cited in the background portion of the present specification.

FIG. 3B shows a detailed side cross-section of a fragment of the tablet assembly of FIG. 3A according to one example of a completed laminar structure of a multi-layered grid wire glass tablet. In FIG. 3B the glass substrate 12 and bonded resin layer 14 are shown within additional laminar layers of the tablet assembly. Bonded to the exposed side of glass substrate 12 is a layer of honeycomb 34, for example, 0.75 inches (2 cm) thick, of phenolic impregnated paper cells, for example, ⅜ inch to ½ inch (1 to 1.3 cm) cells. The honeycomb layer 34 is glued by adhesive to the glass substrate 12 on one side and to the steel sheet 31 on the other side, strengthened by adhesive fillets which build up on either side of the edge contact conjunctions between the honeycomb 34 and the glass substrate 12 on the one hand and the steel sheet 31 on the other hand. Interposition of the adhesively bonded layer of honeycomb 34 imparts strength in tension and compression to the tablet assembly.

On the resin layer side 14 of the glass tablet is adhesively bonded a layer of Formica-type material to provide a working surface layer 35, upon which working surface graphic information is expressed for digitizing, using a digitizing pen or other instrument. Such a layer of Formica-type material or similar material may be typically 0.031 inches (0.7 mm) in thickness.

A typical glue, adhesive or bonding material for the laminar layers would be, for example, a urethane glue.

Before turning in detail to the method of fabricating the wire grid glass digitizing tablets, attention is directed to an apparatus and fixture for carrying out such a method. The manufacturing apparatus is housed on a heavy duty and heavy weight framework 40 which may be anchored to a cement floor or other ground work for further stability. The fixture framework 40 is provided with heavy legs and braces as shown in FIG. 4 and an upper four-sided surface 42 around the periphery for supporting in part a grid wire frame assembly and other apparatus elements for a glass digitizing tablet fabrication as hereafter described. The upper periphery 42 of the fixture 40 defines a central cavity 43 in which is mounted the lift platform and hydraulic lift by braces 44a and 44b, etc. Because the fixture framework may have to bear several thousand pounds of force in the manner hereafter described, it is advisable to bolt the fixture to a cement floor for rigidity and accuracy.

FIG. 5 is a plan view of the fixture with glass digitizing tablet fabrication components and elements assembled on the fixture framework of FIG. 4. The assembled fabricating fixture includes the flat outer bearing surfaces 42 of the fixture framework as previously shown in FIG. 4, supplemented by pull-out bars 45a and 45b which effectively function as the outer bearing surfaces 42 of the fixture framework on the two sides 42a and 42b. A grid wire frame 50 on which is strung and assembled the X, Y coordinate grid or matrix of conductive wires is shown in FIG. 5 resting in position on the top of the fixture framework 40 with two sides 50a and 50b of the grid wire frame assembly 50 resting on the bearing surfaces of pull-out bars 45a and 45b on the two sides of the fixture framework 42a and 42b. On the opposite two adjacent sides of the fixture 40 the grid wire frame 50 and in particular, sides 50c and 50d rest upon the outer bearing surface sides 42c and 42d respectively.

Thus, as will hereaftermore fully appear, the grid wire frame assembly 50 upon which the X,Y coordinate grid of conducting wires is assembled by stringing extends beyond the dimensions proper of fixture framework 40 so that two sides of the grid wire frame assembly rest on the outer bearing surfaces 42c and 42d of the fixture framework while the other two sides 50a and 50b of the grid wire frame assembly extend beyond the outer bearing surface sides 42a, 42b proper of the fixture framework 40 to rest upon the pull-out bars 45a and 45b respectively which function as extendable sides of the framework as is hereafter more fully explained.

The sides 50a, 50b, 50c and 50d of the grid wire frame assembly 50 are aligned on the outer bearing surfaces of the fixture at the wire pulling bars 45a and 45b and bearing surfaces 42c and 42d by means of pre-aligned dowel pins and dowel pin holes (not shown). Furthermore, the sides of frame 50 are clamped to the respective bearing surfaces by 3 to 4 pressure clamps per side, not shown.

Mounted within the central opening or cavity 43 of the fixture framework 40 is a lift platform 55 constructed and arranged to support the glass substrate of the glass digitizing tablet during the fabrication process. Lift platform 55 is mounted over hydraulic lifts (not shown) which raise and lower upon command the platform 55 within the central cavity 43.

Mounted around the inside of the peripheral surface of the fixture framework are four wire locating rails 56, respectively identified as 56a, 56b, 56c and 56d. The wire locating rails 56 are comprised of adjacent coupled segments shown in further detail in FIGS. 5A, 5B, and 5C. Each wire locating rail 56 or wire locating rail segment is provided with an upward projecting wall portion 57, having a flat upper surface in which are formed the wire locating grooves 58 which serve to straighten and align the wires during the fabrication process. The grooves 58 are typically formed 0.2 inches (center to center) and to a depth to accommodate the wire, for example, 28 gauge tinned copper wire or 12.6 one-thousands inch (0.3 mm) with a tolerance of plus or minus 0.2 mils.

Also located around the periphery of the fixture framework, but outside the wire locating rails 56 are the hold-down bars 60 referred to respectively on the four sides as 60a, 60b, 60c and 60d. The hold-down bars 60 are mounted over the peripheral surfaces 42 of the fixture by means of threaded clamps 61 with handles for turning the mounting threads to raise and lower the hold-down bars 60. The threaded clamps 61 permit application of downward force on the hold-down bars 60 which rest on the wires of the respective X,Y coordinate grids after the grid wire frame assembly 50 is placed on the top of the fixture 40 and clamped in place, and after the wires are stretched. As shown in FIG. 5D, each hold-down bar 60 is formed with a rounded lower surface 62 for bearing against the row of parallel wire conductors of either the X or Y coordinate grid portion of the X, Y coordinate grid or matrix 15 as hereafter more fully appears. The handle 61 permits complete removal of the hold-down bars 60 when the grid wire frame assembly 50 is mounted on or removed from the fixture.

A further feature of the grid wire frame assembly 50 should be noted in FIG. 5. Three corners of the grid wire frame 50 are provided with threaded handles 51 which permit separation of frame sides 50a and 50b from sides 50c and 50d (see FIG. 7B). When the grid wire frame assembly is mounted on the fixture, each of the sides 50a through 50d is clamped to bearing surfaces or pull-out bars of the fixture. Sides 50c and 50d are clamped by clamps not shown to bearing surfaces 42c and 42d of the fixture which are stationary. Thus, grid wire frame assembly sides 50c and 50d remain stationary relative to the fixture. On the other hand, grid wire frame sides 50a and 50b are clamped by clamps not shown to the pull-out bars 45a and 45b which are moveable relative to the fixture as hereafter described in more detail with reference to FIG. 6. Thus, once the corner threaded handles 51 are removed from the grid wire frame assembly, grid wire frame sides 50a and 50b may translate with pull-out bars 45a and 45b away from the fixture framework 40 in order to tension the X and Y coordinate grids beyond the yield point of the ductile wire comprising the grids. The grid wire frame sides 50a and 50b may thereafter be reassembled with the other adjacent sides secured to the stationary portions of the fixture for subsequent use. As hereafter will also more fully appear, the X,Y coordinate grid wires are strung around rollers 52 accurately and sequentially spaced along the face of frame 50 so that the X,Y coordinate grid or matrix extends over and beyond platform 55 on which is supported the glass substrate and uncured resin layer, and furthermore, so that the X and Y coordinate grid elements extend over and beyond the wire locating rails 56 and below and beyond the holddown bars 60 to the peripheral sides of the grid wire frame 50. For example, for a tablet 64" long, wire lengths of 85" length are assembled on the grid wire frame rollers.

Figure 6:
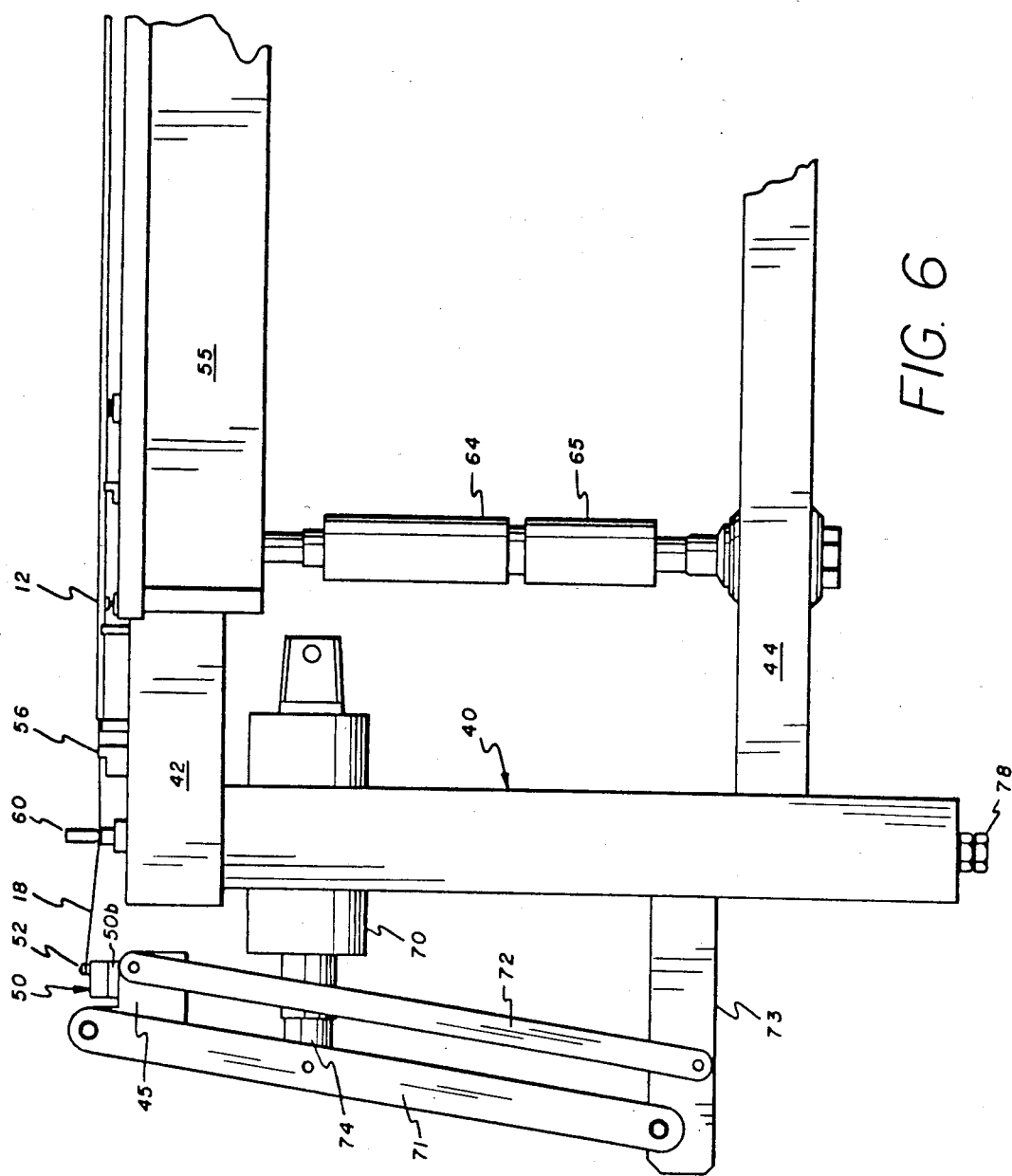
FIG. 6 is a detailed fragmentary side view of one of the two sides of the fixture illustrated in FIG. 5 in which the outer bearing surface comprises a pull-out bar with means for extending the pull-out bar to stretch lengths of wire.

Referring now to FIG. 6, the lift platform 55 can be seen mounted within the fixture framework 40 at one side on hydraulic lift cylinders 64 and 65, in turn, mounted on the fixture beam 44. In this illustration, the lift platform 55 upon which is mounted the glass substrate 12 is in raised position. In this position, prior to placement of a grid wire frame assembly, the glass substrate is prepared by forming a thin resin layer across the surface of the glass substrate. The hydraulic cylinders 64 and 65 have sufficient stroke, for example, three inches (7.6 cm) and one inch (2.54 cm) to lower the prepared glass substrate out of the way during mounting of the grid wire frame assembly. In the lower position, the resin layer formed across the surface of the glass substrate is permitted sufficient time, for example, 15 to 30 minutes, for settling under gravity and surface tension. Settling of the surface of the resin layer may be facilitated by spraying a volatile solvent such as alcohol across the surface to facilitate release of bubbles and settling.

In preparing the glass substrate with a layer of uncured resin, care should be taken to use the "clean side" of the float glass. The "clean side" of the float glass may be identified by methods known in the art and the resin layer should be applied on this side.

The uncured resin, ultra-violet and anaerobic sensitive, may be spread over the surface of the glass substrate manually be troweling. However, this tends to introduce bubbles which slows the settling and leveling of the resin layer. Therefore, the resin is distributed over the surface of the glass substrate preferably by pouring or flowing rather than by troweling. The resin is permitted to settle and level for 15 to 30 minutes, achieving a surface thickness of approximately 50 thousands of an inch. As heretofore described, the resin surface may be sprayed with a volatile solvent mist to facilitate release of bubles and leveling.

Referring again to FIG. 6, one of the pull-out bars 45 is shown on its mounting of lever arms 71 and 72 typically mounted to rigid arm 73 extending from the fixture framework 40. A horizontal hydraulic cylinder assembly 70 is provided adjacent the upper portion of the fixture with piston 74 mounted to lever arms 71 for forcefully translating the pull-out bar 45 away from or towards the upper surface of the fixture. Hydraulic cylinder 70 is provided, for example, with a four inch (10 cm) stroke for tensioning grid wires of either the X or Y coordinate grid beyond the yield point and stretching the wires a fixed distance measured by the stroke of hydraulic cylinder 70, for example, four inches (10 cm).

Pull-bar 45 provides an effective extension of the outer bearing surface 42 of fixture framework 40 upon which rests the grid wire frame assembly 50. As shown in FIG. 6, the parallel wires 18, either the X or Y coordinate grid component of the grid matrix, pass around rollers 52 spaced sequentially along the face of opposite sides of grid wire frame assembly 50. It should be recalled that while two adjacent sides 50a and 50b of grid wire frame assembly 50 rest upon pull-out bar extensions 45a and 45b of the fixture framework 40, the other two adjacent sides, 50c and 50d of grid wire frame assembly 50 rest upon and are clamped to the stationary outer bearing surfaces 42c and 42d of the fixture 40.

After the respective sides of the grid wire frame assembly 50 are clamped to the respective pull-out bars or outer bearing surfaces of fixture 40, the lengths of wire in the X coordinate direction and the Y coordinate direction are tensioned to the yield point and then stretched beyond that a predetermined distance according to the stroke of hydraulic cylinder 70. For lengths of wire 85 inches, stretching beyond the yield point of a distance of four inches has been found satisfactory to remove all kinks and assure straightness of the wires without damage or weakening.

With 28 gauge tinned copper wire, 8 pounds of force are required on each strand or length of wire to achieve the tensioning beyond the yield point and stretching by plastic flow the specified distance. For the large size tablet, 64 inches (162.6 cm) in the long direction, a total force of over 2,500 pounds (over 1,137 kg) is required for 320 lengths of wire. Because of the forces involved bearing across the fixture, bolting to the cement floor by means of bolts 78 is desirable. Such permanent attachment to the structural ground also facilitates leveling of the lift platform 55 so that the glass plate substrate 12 may be maintained in a precisely level condition during preparation and settling of the resin layer formed across the surface of glass plate 12.

A feature and advantage of the use of ductile material wire in accordance with the present invention is that the individual lengths of wire yield at about 8 pounds of force, while conventionally used tensile steel piano wire requires at least 250 pounds of force to begin to straighten out. While the fixture, according to the present invention, must bear considerable cumulative forces, summed over all of the wires, such forces are still orders of magnitude less and therefore safer than would be required in using conventional music wire.

With lift platform 55 and hydraulic cylinder 64 and 65 in the lower position, the grid wire frame assembly 50 on which the X, Y grid or matrix 15 has been assembled, is mounted on the upper surfaces of the fixture 40. The sides of the grid wire frame 50 are clamped to the respective sides of fixture framework 40 and pull-out bars 45. The hydraulic cylinders 70 are extended the specified stroke distance, stretching and straightening the X and Y coordinate grids 16 and 18.

Figure 7A:
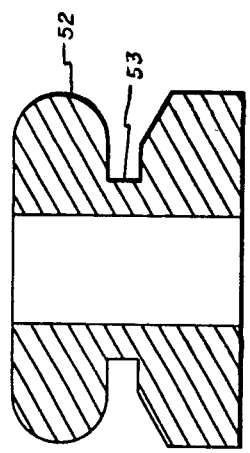
FIG. 7A is a detailed side cross-section of one of the rollers mounted around the sides of the grid wire frame assembly of FIG. 7.
Figure 7B:
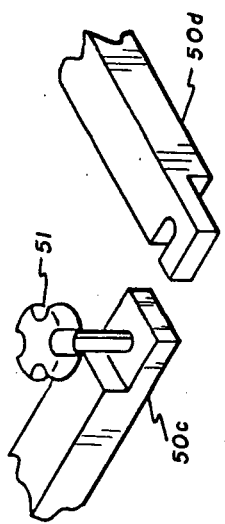
FIG. 7B is a perspective view showing the manner in which the sides of the grid wire frame are assembled.
Figure 7:
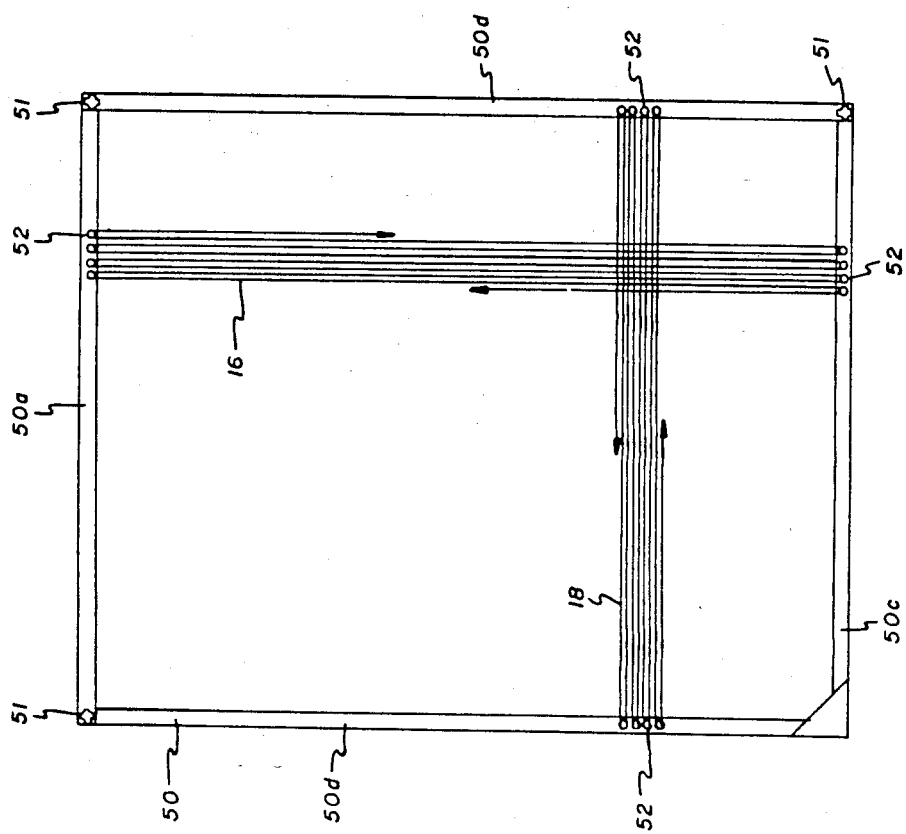
FIG. 7 is a plan view of a grid wire frame assembly on which is assembled the X,Y coordinate grid of conducting wires by stringing a wire back and forth around the rollers mounted along opposite sides of the grid wire frame assembly.

For better visualization of the grid wire frame assembly 50 and method set forth above, reference is made to FIGS. 7, 7A and 8. The grid wire frame assembly 50 is shown alone in FIG. 7, including frame sides 50a, 50b, 50c and 50d as previously indicated with reference to FIG. 5. The face of each of the sides supports a row of spaced rollers 52 only a few of which are shown on each side of the grid wire frame 50. The roller 52 is shown in more detail in FIG. 7A and is generally mounted on a shoulder bolt for free rotation in response to movement of the wires around the grooves 53 of the respective rollers 52. A feature and advantage of the invention is that each of the X or Y coordinate grid elements 16 and 18 is formed from a single strand 1 of wire by threading or stringing back and forth around the rollers 52 on opposite sides of the frame 50.

Thus, each of the X and Y grid coordinate elements comprises a single, continuous filament advantageous for continuity testing at an early stage in the fabrication process as hereinafter described. As previously indicated, threaded handles 51 permit disassembling two sides of the grid wire frame 50 for tensioning the grid wires mounted on the fixture in the manner heretofore described. Another feature and advantage of the single filament roller mounting of each of the X and Y coordinate grids of conducting wire is that the tensioning force is distributed evenly over all of the lengths of the grid and all of the lengths are equally and simultaneously tensioned to the yield point and then stretched an equal amount according to the pre-set stroke of hydraulic cylinder 70.

After tensioning and stretching of the X, Y coordinate grids, the hold-down bars or wire clamps 60 are lowered by the threaded handle clamps bearing against the grid wires and urging into the grooves of wire locating rails 56 as shown in FIG. 6.

The hold-down bars apply and urge the wires into the grooves of the wire locating rails with slight additional tension. Consideration must be given to the depth to which the hold-down bars should be clamped in pushing the wires into the grooves. On the one hand, the hold-down bars must push the wires until they are seated into the grooves and will not lift up. On the other hand, the angle of down tensioning cannot be too great as this may tend to lift the wire from the groove on the side opposite the hold-down bar. The hold-down bars serve to add a slight additional tension to the wires which are now stretched beyond the yield point, securing them in the desired accurate position over the glass substrate and uncured resin layer. Thus, during stretching the wires are slightly above the grooves, and once stretched, they are held down in the grooves with slight additional tension by the hold-down bars.

The various movements involved are shown in the diagram of FIG. 8 where relative to lift platform 55 on which is mounted the glass substrate 12 prepared with a layer of uncured resin, the pull-out bars 45 move outward after which the hold-down bars 60 move downward, urging the grid wires into the grooves 58 of wire locating rails 56 shown in further detail in the diagrammatic view of FIG. 8A.

A check is made to assure that the grid wires are seated appropriately in respective grooves 58 of the wire locating rails 56 and to assure that they are uniformly recessed below the upper surface of the locating and spacing rail 56. With the wires properly tensioned and stretched, and accurately spaced and aligned within the grooves, immersion of the X,Y coordinate grid or matrix by 70 previously prepared resin layer may proceed.

Lift platform 55 on which is mounted the prepared glass substrate is at that time in the lower position. The uncured resin layer formed over the surface of the glass substrate, supported on lift platform 55, has settled for 15 to 30 minutes for uniform flatness under gravity and surface tension. The lift platform 55 is then raised until the uncured resin layer supported over the glass substrate contacts and immerses the X, Y coordinate grid or matrix 15 supported by the grid wire frame assembly 50 and fixture 40 over the lift platform 55. A stop mechanism or stop switch assures that the surface of the glass substrate stops before contact with the grid wires and, in fact, a distance of 10 to 11 thousands of an inch (0.25 mm to 0.27 mm) below the grid wires. In this manner, both axes of the X and Y coordinate grid or matrix are immersed in the 50 thousands inch (0.12 cm) thick resin layer, both axes or coordinates spaced from each other and spaced from the upper surface of the resin layer and the glass surface below.

After immersion of the X, Y coordinate grid or matrix 15 in the resin layer 14 previously prepared on the glass substrate 12, the uncured resin layer is permitted to settle once again for several minutes. A volatile solvent may again be sprayed over the resin surface to release bubbles and facilitate settling. Rapid curing of the resin layer is thereafter initiated. Such curing must take place as quickly as possible to prevent runoff of resin over the edge of the glass substrate because the wire volume raises the level of the resin slightly. It should be kept in mind that according to the invention, the resin layer is supported on the glass substrate only under the forces of gravity, surface tension, etc.

In order to achieve a rapid cure, for example, within a curing period of five minutes, a resin or resin mixture is selected sensitive to ultra-violet irradiation and anaerobic conditions for accelerated curing. Such resins include the acrylics and epoxies.

The rapid cure of the resin layer 14 is accelerated by the use of an ultra-violet light hood 80 illustrated in FIGS. 9 and 9A, mounted over the fixture for raising and lowering over the upper surface of the fixture on which is supported the glass substrate 12, resin layer 14, and X, Y coordinate grid or matrix now immersed in the resin layer. The hood 80 is constructed and arranged to have the same overall area dimensions as the upper surface of the fixture for enclosing the upper surface, including the glass substrate and resin layer within the hood housing. Thus, the opaque upper surface 81 of hood 80 has the same area as the upper surface of the fixture and the grid wire fram assembly. The sidewalls 82 further enclose the volume covered by the hood. The hood includes a plurality of ultra-violet light lamps or sources 83 and power supply ballast 84 within a channel 85 secured to the top of the hood.

A feature and advantage of the ultra-violet light hood 80 is that it functions at the same time as a manifold for flooding the resin layer with an anaerobic gas such as nitrogen or carbon dioxide. The combined action of the ultra-violet light irradiation and anaerobic environment effects a cure of the resin layer within five minutes. Because the curing of the resin layer is an exothermic reaction, the flooding with nitrogen or carbon dioxide or other anaerobic gas not only displaces oxygen for rapid curing, but also acts to cool the reaction taking place across the resin layer.

Curing of the resin layer with ultra-violet irradiation actually takes place in a series of steps or exposures. According to one method, four 20 to 30 second exposures are used, separated by intervals of, for example, 30 seconds, followed by a longer exposure of 1 to 2 minutes. Flooding with nitrogen is initiated before the ultra-violet irradiation exposures begin and carries on towards the end. The flooding nitrogen not only provides an anaerobic environment but also acts as a cooling agent for the exothermic reaction. When the curing cycle is completed, the supply of nitrogen or other anaerobic gas is turned off and the ultra-violet light fixture or hood is raised for inspection of the tablet.

Upon completion of curing the hood 80 is raised to an upper position above the fixture by a standard mechanism (not shown). The hold-down bars 60 are lifted and removed and the tension applied by pull-out bars 45, and hydraulic cylinder 70 is released. The grid wire loops extending from the now cured tablet are removed over the rollers 52 for continuity testing prior to cutting and trimming.

A feature and advantage of the present invention and method and arrangement for assembling the X, Y coordinate grid or matrix 15 on the grid wire frame assembly 50 is that continuity testing of the grid wires now embedded in the resin layer may be completed at an early stage in the manufacturing process. After continuity testing of each coordinate wire to assure freedom from electrical fault, the wires are trimmed in the manner shown, for example, FIGS. 1 and 2. The basic glass substrate and resin layer tablet structure may then be incorporated in a laminar tablet assembly, for example, of the type described above with reference to FIG. 3B.

For this purpose, the tablet is placed on a vacuum table and adhesive is spread over the surface of the glass. The honeycomb layer is then bonded to the glass plate. A large, impervious plastic cover, for example, a vinyl sheet, is held over the vacuum table by, for example, an aluminum frame, and the vacuum is applied to facilitate pressing and bonding. The honeycomb is, in turn, glued to an aluminum base as heretofore described with reference to FIG. 3. The thin Formica or other Formica type material working surface is bonded to the resin layer also using a vacuum to provide a press between the laminar layers, and the assembly is removed from the vacuum table.

Instead of using an opaque Formica like material for the working surface of the tablet assembly, a translucent or transparent material such as a vinyl working surface may be used where the tablet assembly is to be backlighted. In that event, the opaque steel sheet backing and honeycomb layer are omitted to permit back-lighting to pass through the working surface of the tablet.

While the invention has been described with reference to particular example embodiments, it will be appreciated that it is intended to cover all variations and equivalents within the scope of the following claims.

I claim:

1. A method of fabricating a precision wire grid glass tablet for translating graphic location or movement information into corresponding electrical signals comprising:
   forming a first wire grid by stringing wire of ductile material on a frame assembly and aligning and spacing lengths of wire in a parallel array in a common plane;
   forming a second wire grid by stringing wire of ductile material on said frame assembly in a second parallel array and second common plane spaced from the first, said second grid comprising parallel lengths of wire perpendicular to the lengths of wire of the first grid;
   preparing a flat glass plate by spreading a relatively thin layer of resin material over the flat upper surface of the glass plate;
   delaying curing of the resin layer during a period of time permitting the resin layer to distribute evenly and become at least partially settled under the influence of gravity and surface tension;
   positioning the frame assembly of first and second wire grids over the glass plate;
   tensioning the lengths of wire of the first and second grids to beyond the yield point of the ductile material comprising said wire until the lengths of wire exhibit plastic flow thereby assuring straightness of said lengths of wire prior to immersing said lengths of wire in said resin layer;
   raising the glass plate beneath the first and second grids and immersing the lengths of wire of the first and second grids in the resin layer supported on the upper surface of the glass plate following the at least partial settling of the resin layer under the influence of gravity and surface tension; and
   rapidly curing the resin layer whereby the first and second grids are potted in the resin layer and bonded to the structural glass plate.

2. The method of claim 1 further comprising the step of rapidly curing the resin layer by applying ultra-violet light.

3. The method of claim 2 wherein said resin comprises an anaerobic curing resin and further comprising the step of rapidly curing the resin layer by flooding the tablet with anaerobic gas displacing oxygen during the curing step.

4. The method of claim 3 wherein said gas is selected from the group consisting of nitrogen and carbon dioxide.

5. The method of claim 1 further comprising the step of spraying a volatile solvent over the surface of the resin layer prior to curing thereby releasing bubbles from the surface of the resin layer and enhancing leveling.

6. The method of claim 1 wherein the step of tensioning the wire comprises evenly distributing the tensioning force over the lengths of wire of the parallel array comprising the respective grid.

7. The method of claim 1 wherein the step of forming a wire grid comprises stringing a single piece of wire back and forth in serpentine fashion with turns at opposite sides of the parallel array on a frame assembly.

8. The method of claim 7 wherein said frame assembly comprises roller means staggered along opposite sides and wherein the step of forming a wire grid comprises stringing a single wire back and forth in serpentine fashion around alternate roller means on opposite sides of said frame assembly.

9. The method of claim 7 further comprising the step of testing the continuity of the single piece of wire before cutting the wire of each grid adjacent the turns at opposite sides of the glass plate and resin layer.

10. The method of claim 1 further comprising the step of accurately spacing and aligning the lengths of wire after tensioning by pushing the wires into accurately spaced grooves of a wire guide rail.

11. A method for fabricating wire grid glass digitizing tablets comprising:
    arranging and supporting an X,Y coordinate grid of respectively parallel lengths of ductile wire;
    stretching said lengths of wire beyond the yield point of the ductile material comprising the lengths of wire until the lengths of wire exhibit plastic flow;
    preparing a glass substrate by forming a relatively thin layer of uncured resin over the surface of said glass substrate and permitting the resin layer to at least partially settle and flatten under the forces of gravity and surface tension;
    raising the glass substrate below the X,Y coordinate grid until the wires of said grid are immersed in the resin layer after the resin layer has at least partially settled;
    permitting the resin layer to fully settle; and
    rapidly curing said resin layer.

12. The method of claim 11 further comprising the step of spraying the surface of the resin layer during settling with a volatile solvent to facilitate flattening.

13. The method of claim 11 further comprising the step of accurately spacing and aligning the lengths of wire of the X,Y coordinate grid.

14. Apparatus for fabricating wire grid glass digitizing tablets comprising:
   a base fixture having a four-sided framework, each side having outer bearing surface means and inner wire locating rail means, each said wire locating rail means having an upper edge with grooves therein in accurately spaced and aligned positions for receiving and retaining grid wires of ductile material and accurately spacing and aligning said grid wires within the grooves, said base fixture formed with an inner cavity within the four-sided framework;
   lift platform means mounted for vertical translation within the cavity of the base fixture, and means for raising and lowering the platform means in said cavity;
   the outer bearing surface means of at least two adjacent sides of the base fixture, comprising wire pulling bars moveable from said base fixture and means for translating the wire pulling bars of said at least two sides alternately away from and back towards the base fixture;
   hold-down bar means and means for mounting the hold-down bar means to the base fixture at the four sides thereof between the respective outer bearing surface means and wire locating rail means, said hold-down bar means and mounting means constructed and arranged for bearing down on "X" and "Y" coordinate grid wires of a four-sided grid wire frame assembly mounted on the respective outer bearing surface means of the four-sided framework of the base fixture, and for urging said wires into respective grooves of the wire locating rail means for accurate spacing and alignment; and
   grid wire frame assembly having four sides with a plurality of roller means accurately spaced along said sides around the face of the four-sided assembly for receiving an "X" coordinate grid wire winding alternately back and forth around the roller means of two opposite sides and a "Y" coordinate grid wire winding alternately back and forth around the roller means of the other two opposite sides and spaced from the "X" coordinate grid wire winding, the outer bearing surface means of the base fixture four-sided framework constructed and arranged to receive the four sides of the grid wire frame assembly, and means for aligning and clamping the grid wire frame assembly to the outer bearing surface means of the base fixture four-sided framework, said grid wire frame assembly having at least two sides separable from said assembly, said two separable sides oriented for clamping to the moveable bearing surface means comprising wire pulling bars whereby "X" and "Y" coordinate grid wire windings may be tensioned beyond the yield point of said wires with tension evenly distributed by said roller means and so that the wires exhibit plastic flow.

15. The apparatus of claim 14 wherein said means for raising and lowering the platform means comprises hydraulic lift means and stop means for stopping the platform means at a specified elevation relative to grid wires accurately spaced and aligned in the wire locating rail means.

16. The apparatus of claim 14 wherein said inner wire locating rail means comprise:
   first and second wire locating rails for accurately spacing and aligning "X" coordinate grid wires in a first plane, said wire locating rail means further comprising second and third wire locating rails for accurately spacing and aligning "Y" coordinate grid wires in a second plane spaced from the first.

17. The apparatus of claim 14 wherein said means for translating the wire pulling bars comprises hydraulic cylinder means.

18. The apparatus of claim 14 further comprising ultra-violet light irradiation means and overhead hood means housing said irradiation means, said hood means mounted over the base fixture and grid wire frame assembly mounted on the fixture, said hood means moveable between a raised position and a lower position adjacent to the base fixture four-sided framework and a grid wire frame assembly mounted thereon, said hood means constructed and arranged with four sides for substantially covering the base fixture four-sided framework and a grid wire frame assembly mounted thereon when the hood means is in the lower position.

19. The apparatus of claim 18 wherein said hood means further comprises gas manifold means for releasing anaerobic gas for flooding the base fixture and grid wire frame assembly supported thereon with said gas for displacing oxygen.

20. The apparatus of claim 19 wherein said gas is selected from the group consisting of nitrogen and carbon dioxide.

21. The apparatus of claim 14 wherein said lift platform means is constructed and arranged for raising a glass plate substrate having an uncured layer of resin spread across the upper surface thereof and wherein said means for raising and lowering the platform means in said cavity comprises stop means for stopping the lift platform when the "X" and "Y" coordinate grids are immersed in the uncured resin layer spread across the upper surface of a glass plate supported on the lift platform means.

22. Apparatus for fabricating wire grid glass digitizing tablets comprising:
   base fixture means having a four-sided framework for receiving and retaining a grid wire frame assembly, said base fixture means formed with a central cavity, lift platform means mounted for vertical translation within the cavity, and means for raising and lowering said platform;
   a grid wire frame assembly having four sides for supporting an X,Y coordinate grid of lengths of wire of ductile material, and means for clamping said grid wire frame assembly to the base fixture means four-sided framework, at least two sides of said respective grid wire frame assembly and base fixture means four-sided framework being separable and moveable from the respective assembly and fixture means for tensioning the lengths of wire of an X,Y coordinate grid at least to the yield point of the wire so that the lengths of wire exhibit plastic flow;
   said lift platform means constructed and arranged for receiving and supporting a glass substrate, having a relatively thin uncured resin layer formed thereon and for raising said glass substrate to immerse the lengths of wire of the X,Y coordinate grid in said resin layer after said resin layer has at least partially settled under the influence of gravity and surface tension.

23. The apparatus of claim 22 wherein said base fixture means further comprises wire guide rail means having an upper edge with accurately spaced grooves formed therein and hold-down bar means for urging lengths of wire of an X,Y coordinate grid into the grooves of the wire guide rail for accurate spacing and aligning.

* * * * *